US006988868B2

(12) United States Patent
Ashworth (10) Patent No.: US 6,988,868 B2
(45) Date of Patent: Jan. 24, 2006

(54) PROPULSION LINEARIZING MECHANISM (76) Inventor: Eric Ashworth, 723-12th Street, E., Saskatoon, Saskatchewan (CA) S7H 0H5

(*) Notice: Subject to any disclaimer, the term of this patent is extended or adjusted under 35 U.S.C. 154(b) by 0 days.

(21) Appl. No.: 10/485,208

(22) PCT Filed: Aug. 6, 2002

(86) PCT No.: PCT/CA02/01224

§ 371 (c)(1),
(2), (4) Date: Jul. 21, 2004

(87) PCT Pub. No.: WO03/014853

PCT Pub. Date: Feb. 20, 2003

(65) Prior Publication Data
US 2004/0240998 A1 Dec. 2, 2004

Related U.S. Application Data (60) Provisional application No. 60/309,781, filed on Aug. 6, 2001.

(51) Int. Cl.
*F01D 1/24* (2006.01)
(52) U.S. Cl. .................... 415/60; 416/120
(58) Field of Classification Search ............ 415/60, 415/195, 211.2, 142; 416/120
See application file for complete search history.

(56) References Cited

U.S. PATENT DOCUMENTS 1,845,561 A * 2/1932 Runge ................... 415/60
2,729,389 A * 1/1956 Koch .................... 415/60
5,810,289 A    9/1998 Sager
6,139,439 A * 10/2000 Ure ..................... 472/136

FOREIGN PATENT DOCUMENTS

GB    1331497    9/1973

* cited by examiner

Primary Examiner—Edward K. Look
Assistant Examiner—Devin Hanan
(74) Attorney, Agent, or Firm—Ryan W. Dupuis; Michael R. Williams; Adrian D. Battison (57) ABSTRACT

A propulsion linearizing mechanism is provided for linearizing a fluid flow. The mechanism includes a frame having a cylindrical outer baffle which rotatably supports a plurality of propeller elements thereon. Each propeller element defines a respective sweep area as the propeller element is rotated which overlaps sweep areas of adjacent propeller elements. The outer baffle circumscribes an outer periphery of the collective sweep areas of the respective propeller elements. The propeller elements rotate in the same direction whereby forces of curvature flow of adjacent propeller elements substantially cancel one another to linearize fluid flow through the mechanism. Additional baffles and infills within the areas of non blade sweep may be provided for particular applications of the mechanism. In various applications, linear forces of vector flow are formed by integrating curvature forces of tangential flow and economy flow systems are established to increase force potentials on the planes of rotating propellers to provide the emission and induction flow with an insulation whereby fluid in the immediate vicinity of the mobile flow remains in an undisturbed static state. This allows a fluid propulsion assembly to be fitted with an outer utility mantle in the static zone of the field.

38 Claims, 9 Drawing Sheets

FIG. 15B

# PROPULSION LINEARIZING MECHANISM

This application claims the benefit of provisional application No. 60/309,781, filed Aug. 6, 2001.

The present invention relates to a propulsion linearizing mechanism arranged to linearize a fluid flow which is particularly suited for application in fluid propulsion and in turbines. The mechanism generally comprises a propeller type propulsion system for either pushing fluid in a substantially linear manner, maintaining fluid flow in a substantially linear manner or propelling itself through a fluid along a substantially linear vector.

BACKGROUND OF THE INVENTION

In consideration of the dynamics of fluid kinetics and of a unified field with regard to such, conventional flow machine designs, including pumps, compressors, fans and generators in general, typically lose considerable efficiency due to an inability to maintain fluid flow therethrough in a substantially linear manner. Accordingly conventional designs can be improved so as to provide major benefits with regard to machine efficiency, the required effects concerning desired flow patterns and flow forces regarding performance and a quietness of operation due to the overcoming of turbulence. Consequently, applications of improvements to flow machines can be wide ranging and diversified within the confines of industry in general.

In brief, the unified field of fluid kinetics requires the potentials of energy to be related to a mechanical concept whereby static states, and mobile states refer to dimensions of potential force with dimensions of potential flow and how these forces with flow relate to a dimension of linear force with vector flow or a of curvature force with a tangential flow. It is only by being able to relate these forces and flows to plane dimensions that flow machines can be designed whereby the flows and the forces can be transferred between the horizontal and vertical planes without incurring losses of the dimensional force or forces.

Consequently, a mechanical concept relates the potentials of energy to unequal mobile curvature flows with force and the field energy to being the sum total of the two potentials with regards the linear length of each curve and therefore, the flow machines can be arranged to display two unequal field systems within which tangential curvature flows with force are established, these being the inner field and outer field, comprised of individual chambers, and by which or from which perpendicular linear flows are produced with two directions of potential force.

The method by which these flows and forces are able to be either structured, controlled or transferred between or upon planes requires the establishment of binary forces and bi-polar flows either by machine design set-up to establish such or by machine design set-up to maintain such.

In the either or situation, the forced flow fluid input required to power a turbine generator is delivered by a linear flow of fluid. These fluid flows are structured into linear flows by conduits that are subsequently directed onto impellers so as to rotate a rotor and provide motive curvature force. Typically, turbine generators lose efficiency by not being able to maintain the inputted flow of fluid in a linear flow by rotary activity of the turbine blades. Alternatively, a fluid typically is pressured by rotating propellers within a manifold for propulsion. Typically, air and marine propulsion or hover systems using rotating planes to either achieve propulsion or hover, lose efficiency on the unstructured curve of the produced force in the form of turbulence.

SUMMARY OF THE INVENTION

According to one aspect of the present invention there is provided a fluid flow control mechanism for linearizing a fluid flow, the mechanism comprising:

a generally cylindrical outer baffle arranged to direct flow of fluid therethrough in a flow direction substantially parallel to a central main axis of the outer baffle from an upstream side to a downstream side of the outer baffle; and a plurality of propeller elements supported for rotation, each about a respective propeller axis, the propeller axes being parallel to one another and the main axis of the outer baffle and being spaced circumferentially about the main axis;

each propeller element defining a respective sweep area as the propeller element is rotated about the respective propeller axis thereof which lies perpendicular to the respective propeller axis;

the propeller elements being located such that the outer baffle circumscribes an outer periphery of the collective sweep areas of the respective propeller elements and such that the sweep area of each propeller element is arranged to overlap the sweep area of adjacent propeller elements;

the propeller elements being supported for rotation in the same direction whereby forces of curvature flow of adjacent propeller elements substantially cancel one another to linearize fluid flow in the flow direction.

In accordance with one embodiment of the present invention that demonstrates an octonary bi-polar propulsion and hover system that incorporates an economy flow system, the embodied concept can demonstrate how linear forces of vector flow are formed by integrating curvature forces of tangential flow and how economy flow systems can be established to increase force potentials on the planes of rotating propellers and provide the emission and induction flow with an insulation whereby fluid in the immediate vicinity of the mobile flow remains in an undisturbed static state, allowing the propulsion/hover assembly to be fitted with an outer utility mantle in the static zone of the field and thereby, provides the octonary bi-polar propulsion/hover system with two useful utility areas. One embodied concept described as follows relates to an integral eight propeller set-up that is situated within a manifold above a series of arranged baffles.

Turbine generators using an integral impeller set-up with no internal economy flow system because the flow is already structured would gain in efficiency using the present invention by being able to keep the flow linear by rotary activity. Air and marine propulsion or hover systems using the present invention would produce a structured linear force with vector flow and thereby, achieve far greater efficiency with an overall improved effect with regards the flow not impinging upon the immediate surrounding area.

The internal economy flow system featured within the design of the embodied concept demonstrates a method of increasing propeller propulsion and improving an ability to control hover by using binary oscillating forces of bi-polar flows to connect plane dimensions. It is also demonstrated how these internal economy flows form individual conduits of flow within the main flow that collectively provide the main linear vector flow with a well defined flow pattern that is isolated by a boundary layer from the immediate surrounding area.

Each propeller element, in one embodiment, may comprise a pair of diametrically opposed blades. These propeller elements are preferably all supported for rotation within a common plane, rotation of each propeller element being fixed in timing with rotation of adjacent propeller elements to avoid collision of the propeller elements at the overlapping sweep areas.

The propeller axes are preferably fixed in position relative to one another.

Alternatively, when the propeller elements each comprise a plurality of blades, specifically more than two, each propeller element is preferably rotatable within the respective sweep area which is parallel and spaced in a direction of the main axis from the overlapping sweep areas of adjacent propeller elements.

The sweep area of each propeller element may overlap the sweep area of adjacent propeller elements within a range of 40% to 60% of a length of the blades of the propeller elements, but is preferably overlaps by approximately 50% of a length of the blades.

There may be provided a generally cylindrical inner baffle inscribed within an inner periphery of the collective sweep areas of the respective propeller elements.

The propeller elements are preferably located relative to one another such that an unswept cross sectional area between the inner and outer baffles is substantially equal to an overlapping portion of the sweep areas of the propeller elements.

The inner and outer baffles at the upstream side of the outer baffles preferably extend in a direction of the main axis beyond the propeller elements.

The outer baffle may include a shelf extending radially outward therefrom a distance substantially equal or greater than a diameter of one of the sweep areas of the propeller elements.

In one arrangement, there is provided 8 propeller elements supported at even circumferential spacings between the inner and outer baffles, a cross sectional inner area spanning the inner baffle being substantially equal to the sweep area of one of the propeller elements.

The inner area spanning the inner baffle is preferably enclosed.

There may be provided a driving motor housed within the inner area for driving rotation of the propeller elements.

Alternatively, there may be provided a driven rotor housed within the inner area for being driven by rotation of the propeller elements when supported in a moving fluid.

The inner area may also house common gearing coupling the propeller elements for rotation together at a predetermined timing relative to one another.

There may be provided a cylindrical central baffle concentrically spaced between the inner and outer baffles, the propeller axes being located at spaced positions about the central baffle.

A plurality of radial baffles preferably extend in a radial direction of the main axis between the inner and outer baffles and support the central baffle.

Each propeller axis may be located at an intersection of the central baffle and a respective one of the radial baffles.

The central baffle and the radial baffles are preferably supported on a downstream side of the propeller elements.

An unswept area between the outer baffle and the collective sweep areas of the propeller elements may be enclosed or filled by contoured infills which surround the collective sweep areas of the propeller elements, the contoured infills being in relief and fixed with respect to the outer baffle.

The contoured infills are preferably tapered to be substantially flush with the outer baffle as the contoured infills extend in a direction of the main axis away from opposing sides of the propeller elements.

There may be provided a central infill spanning a central unswept area surrounded by the collective sweep areas of the propeller elements, the central infill being tapered towards opposing apexes along the main axis on opposing sides of the propeller elements.

In a turbine generator configuration, the central infill preferably houses a rotor which is coupled to the propeller elements so as to be driven by rotation of the propeller elements. Length of the blades preferably increases in the flow direction in this instance.

Each propeller element may comprise a plurality of blades at various positions about a full circumference of the propeller element, the blades of each propeller element being rotatable in one or more planes which are offset in a direction of the main axis from the blades of adjacent propeller elements.

There may be provided four propeller elements supported at evenly spaced positions about the main axis, an inner periphery of each sweep area being intersected by the main axis. There is provided a generally cylindrical central baffle intersecting the propeller axes and a plurality of radial baffles extending in a radial direction of the main axis and supporting the central baffle, the radial baffles intersecting one another at the main axis.

Preferably, the propeller elements are rotatably supported on a frame with the propeller axes in fixed relation to one another and the frame, the frame being supported for rotation about the main axis.

In a turbo fan-jet compressor configuration, the mechanism preferably further comprises:

contoured infills enclosing an unswept area between the outer baffle and the collective sweep areas of the propeller elements, the contoured infills surrounding the collective sweep areas of the propeller elements and being tapered on opposing sides of the propeller elements towards the outer baffle;

a central infill spanning a central unswept area surrounded by the collective sweep areas of the propeller elements, the central infill being tapered towards the main axis on opposing sides of the propeller elements;

a cylindrical central baffle concentrically spaced between the central infill and the outer baffle, the propeller axes being located at spaced positions about the central baffle; and a plurality of radial baffles extending in a radial direction of the main axis between the central infill and outer baffles and supporting the central baffle.

Each propeller element may comprise a plurality of pairs of diametrically opposed blades which are stacked along the propeller axis at various angles relative to one another in a helical configuration, each blade having an equal angle pitch of no more than 45 degrees.

When the blades of each propeller element lie in a common plane with corresponding blades of adjacent propeller elements, the propeller elements are preferably rotated together at a predetermined timing relative to one another to avoid collision of adjacent propeller elements having overlapping sweep areas.

In a polarizing unit configuration for production of plasma by low temperature gas fusion, the mechanism preferably further comprises:

a generally cylindrical inner baffle inscribed within an inner periphery of the collective sweep areas of the respective propeller elements;

a generally cylindrical central baffle concentrically spaced between the inner and outer baffles; and a plurality of radial baffles extending in a radial direction of the main axis between the inner and outer baffles and supporting the central baffle;

at least one of the baffles including a passage for receiving a cooling fluid to be circulated therethrough.

In the polarizing unit configuration, each propeller element preferably comprises a pair of diametrically opposed blades, each having a pitch angle of less than 45 degrees, the sweep area of each propeller element overlapping the sweep area of adjacent propeller elements by approximately 50% of a length of the blades of the propeller elements.

There may be provided six propeller elements which are supported for rotation within a generally common plane, rotation of each propeller element being fixed in timing with rotation of adjacent propeller elements to avoid collision of the propeller elements at the overlapping sweep areas.

In the polarizing unit configuration, the mechanism is preferably in combination with a sealed spherical vessel into which gases are pulsed at intermittent intervals and plasma is extracted.

BRIEF DESCRIPTION OF THE DRAWINGS

In the accompanying drawings, which illustrate an exemplary embodiment of the present invention.

DETAILED DESCRIPTION

Referring to the accompanying drawings there is illustrated propulsion linerizing mechanism generally indicated by a reference numeral 10. The mechanism 10 is particularly useful for linearizing fluid flow to increase efficiency in pumps, turbines, compressors or fans and the like. The mechanism is suitably arranged to either push fluid in a linearized fashion, maintain fluid in a linearized fashion or if required propel itself through a fluid on a linear vector. While plural embodiments are illustrated and described herein, the common elements of the various embodiments will first be described herein.

The mechanism 10 includes a frame 20 which supports a plurality of propeller elements 22 thereon. Each propeller element 22 includes radially extending blades 24 which are supported for rotation within a blade sweep area 26 lying perpendicular to a respective propeller axis 28 about which the propeller element is rotated. The frame 20 includes a main axis 30 about which the propeller elements are circumferentially spaced evenly from one another and the main axis. The propeller axes 28 are parallel to the main axis 30 of the frame with the propeller elements being supported on the frame so that the axes 28 remain in fixed position relative to one another. The sweep areas 26 of the respective propeller elements are arranged to overlap one another by approximately 50 percent of the length of each blade 24. The blades further include a pitch angle which is equal or less than 45 degrees.

The frame 20 includes an outer baffle 32 which is cylindrical in shape, being concentric with the main axis 30 of the frame. The outer baffle is arranged to circumscribe the collective sweep areas 26 of the propeller elements so that an outer peripheral edge of the sweep area 26 of each propeller element lies directly adjacent to the outer baffle 32. Height of the outer baffle 32 in the longitudinal direction of the main axis 30 is arranged to project beyond the propeller element 22 in both directions.

Fluid motion relative to the frame 20 of the mechanism 10 passes through the mechanism so as to remain generally linear from an upstream side 34 to a downstream side 36 of the frames, generally parallel to the main axis of the frame.

Turning now to the first embodiment illustrated in FIGS. 1 through 8, eight propeller elements 22 are illustrated. An inner baffle 38 which is cylindrical in shape and supported on the frame concentrically with the main axis, is inscribed within the collective sweep areas 26 of the propeller elements so as to surround a central unswept area 40. When eight propeller elements 22 are provided, the central unswept area 40 is approximately equal to the sweep area 26 of one of the propeller elements. An unswept portion of the cross sectional area between the inner and outer baffles is arranged to be approximately equal to the overlapping sweep areas of the propeller elements. Similarly to the outer baffle, the inner baffle 38 also extends in the longitudinal direction of the main axis beyond the propeller elements 22 in both directions.

Figure 1:
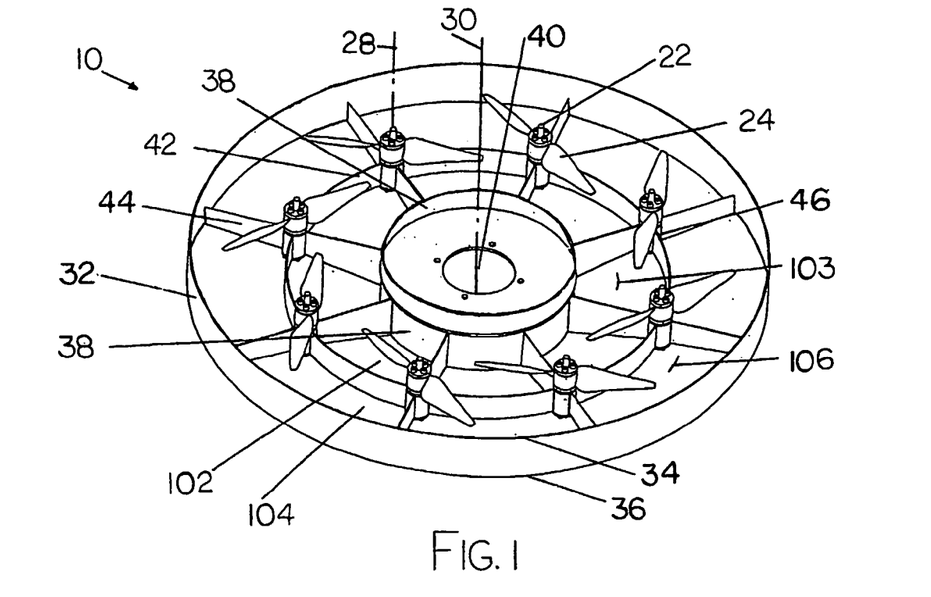
FIG. 1 is a perspective view of a top side of the fluid flow control mechanism.
Figure 2:
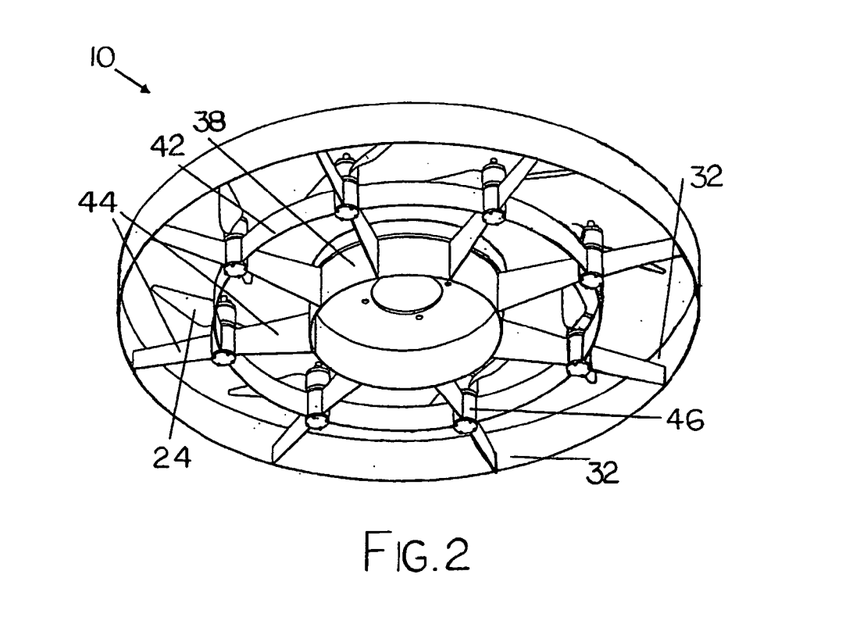
FIG. 2 is a perspective view of a bottom side of the mechanism according to FIG. 1.
Figure 3:
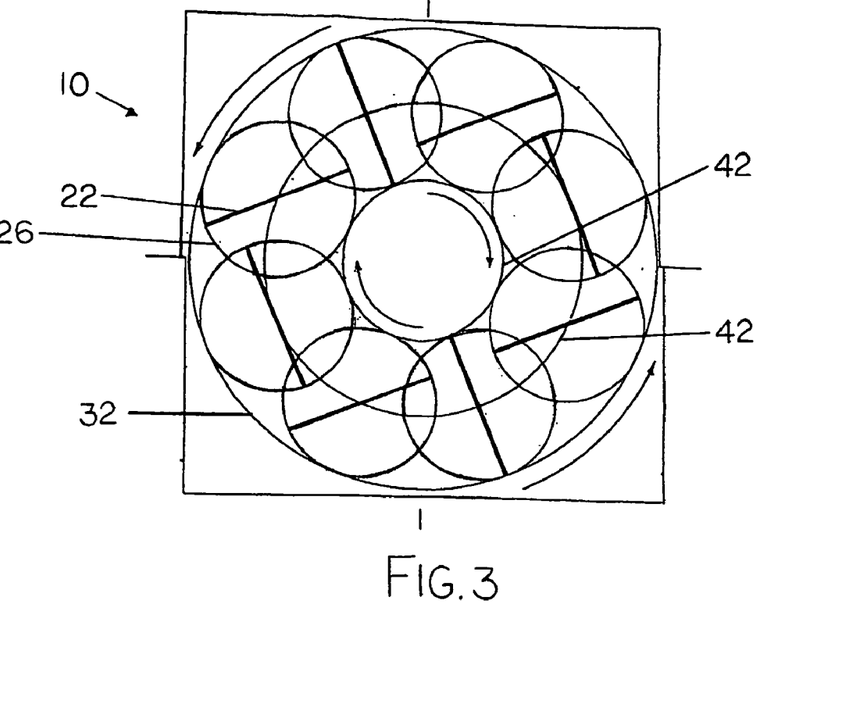
FIG. 3 is a schematic top plan view illustrating the relationship of the propeller elements of the mechanism according to FIG. 1.

A central baffle 42 is provided which is cylindrical and also concentrically mounted about the main axis 30 of the frame. The central baffle 42 is arranged to be spaced centrally between the inner and outer baffles so as to intersect the respective propeller axes 28, with the axes 28 being spaced evenly circumferentially thereabout.

Radial baffles 44 are provided which span in a radial direction of the main axis 30 between the inner baffle 38 and the outer baffle 32. The radial baffles 44 lie parallel to the flow direction and the main axis 30. At an intersection of each radial baffle 44 and the central baffle 42, a rotary housing 46 is mounted for rotatably supporting one of the propeller elements 22 thereon for rotation about its respective propeller axis. The radial baffles 44 support the central baffle, the inner baffle 38 and the propeller elements 22 on the outer baffle 32. The central baffle 42 and the radial baffles 44 are supported downstream form the propeller elements to avoid collision with the propeller elements.

The outer baffle may include a shelf extending radially outward therefrom a distance substantially equal to or greater than a diameter of one of the sweep areas of the propeller elements.

Figure 4:
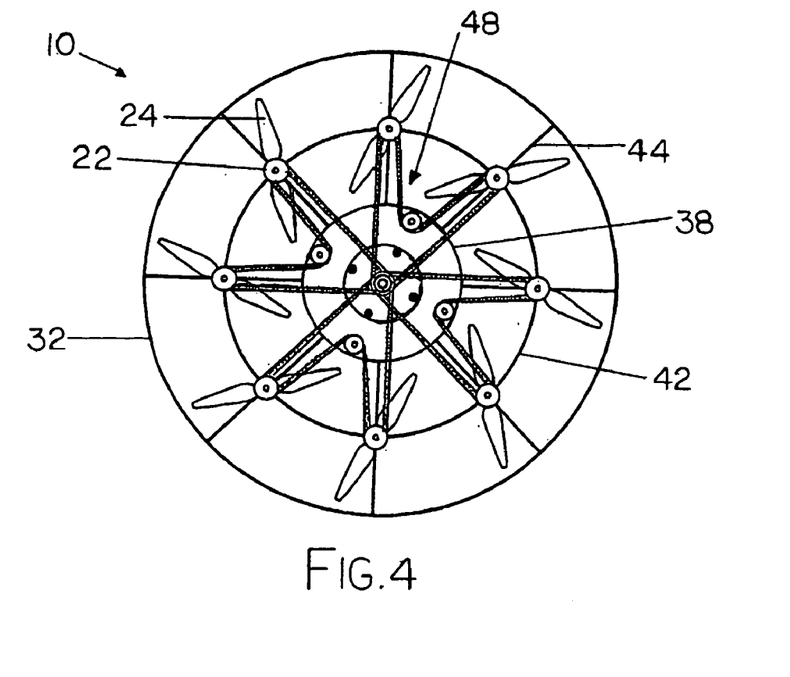
FIG. 4 is a top plan view of the mechanism according to FIG. 1 shown with a suitable drive mechanism connected between the propeller elements.
Figure 5:
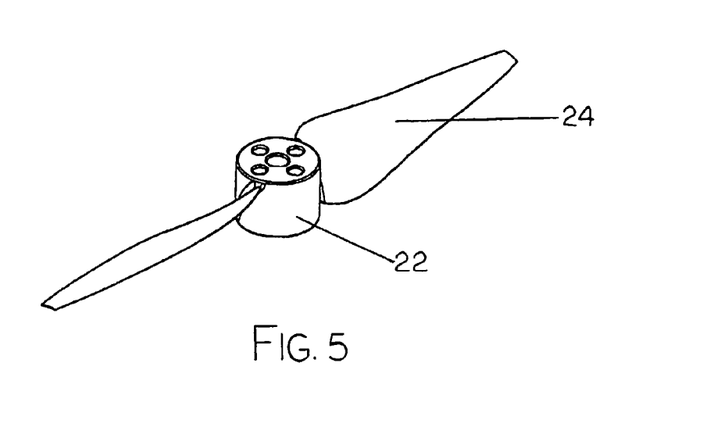
FIG. 5 is a perspective view of one of the propeller elements.
Figure 6:
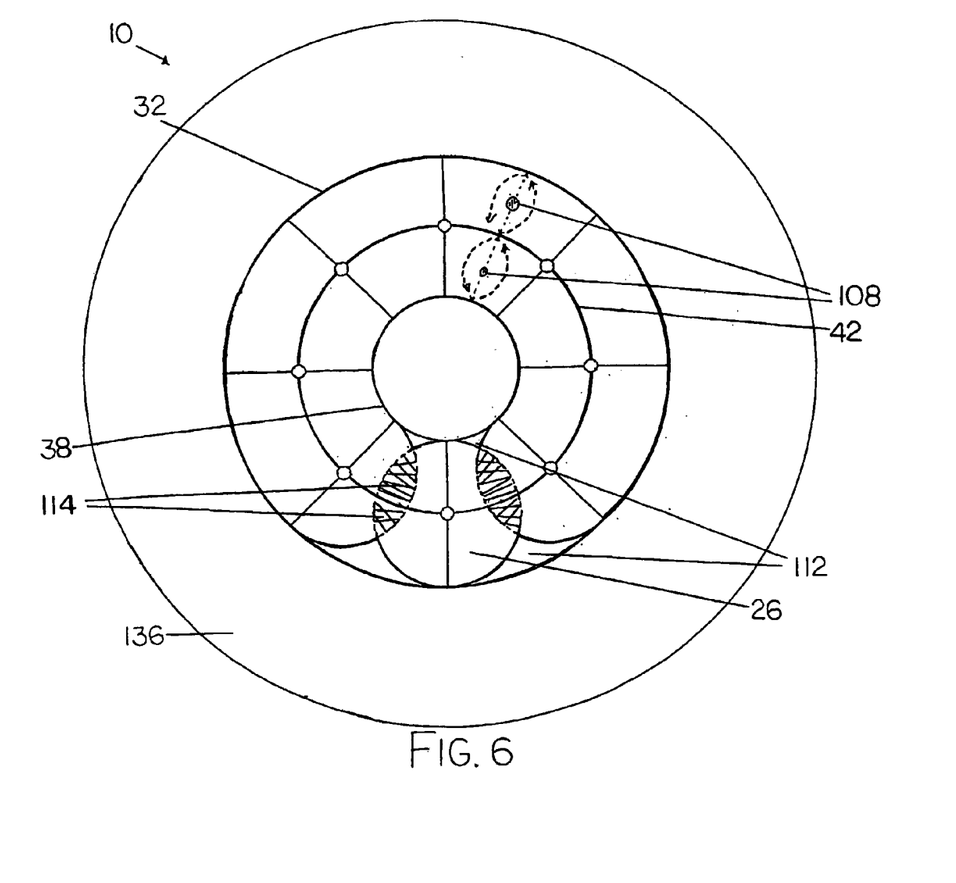
FIG. 6 is a schematic top plan view of the mechanism illustrating the overlapping sweep areas of the propeller elements and the oscillating looped potentials of tangential force.
Figure 7:
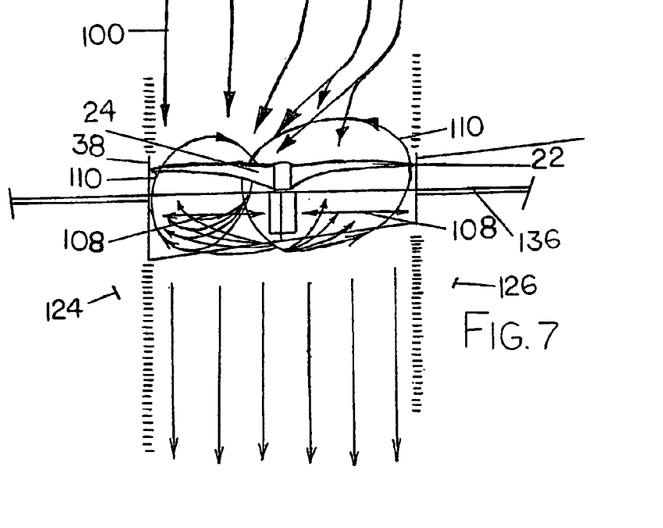
FIG. 7 is a side elevational view of one of the propeller elements which illustrates the mobile flow system of the inner and outer chambers.
Figure 8:
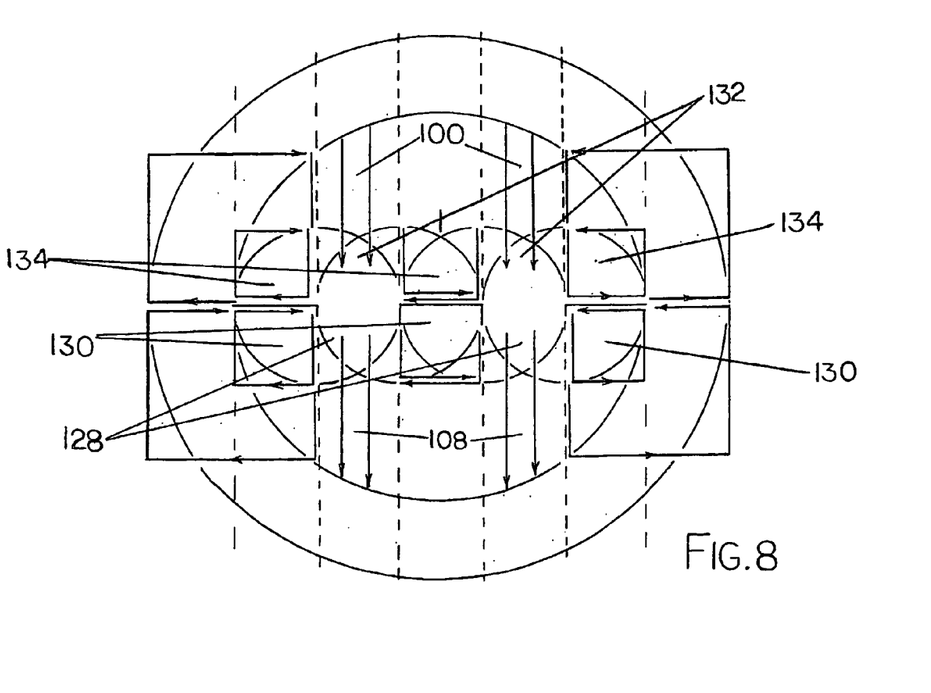
FIG. 8 is a schematic side elevational view of the mobile and static field systems in a mechanism according to FIG. 1.

A drive mechanism 48 is supported on an upstream side of the propeller elements 22 for coupling the propeller elements to rotate together. A motor is housed within the central area 40 to which the drive mechanism 48 is coupled. The drive mechanism 48 includes a series of idler pulleys and belts which interconnect between the output shaft of the motor and the propeller elements.

In the first embodiment, each propeller element 22 includes two diametrically opposed blades which are supported for rotation in a common plane with the blades of the remaining propeller elements. Accordingly, due to the overlapping sweep areas 26, the propeller elements are arranged to be rotated in a fixed timing sequence relative to one another to avoid collision of the blades of the propeller elements. When eight propeller elements are provided each having two diametrically opposed blades, the propeller elements are arranged to be oriented at right angles to the blades of adjacent propeller elements during complete rotation thereof.

When supported in an open configuration, depth of the baffles, also referred to as height of the baffles in the axial direction of the main axis, is proportional to the angle of pitch of the propeller elements, and more specifically the amount of air displaced by the propeller elements. The propeller elements displace a volume of through flow in accordance to each blade and the baffle depth/height is in accordance to each propeller element's amount of displacement of one revolution for optimum interference of the given through flow. In one example, each blade is 8 inches in length at a pitch angle of 45 degrees. Two such blades provide a 16 inch diameter sweep area and on one revolution each blade displaces, as it were, 8 linear inches of fluid that is divided by 4 to arrive at 2 inches per section of each blade and therefore, 4 inches per section for two blades. The inner baffle depth is therefore 4 inches in this example. The inner field area 103, being a condensed area in relation to area 106, requires the full baffle depth, whereas the outer field area 106, due to being less condensed and having to supplement the inner field 103 by the economy flow system and facilitate flow with regard to the exterior outer flow, is able to be of less depth. This less depth is calculated from a 45 degree propeller that pushes a cubic proportion of fluid through the horizontal plane of the propeller elements in relation to the diameter of the sweep area. The central point of the inner and outer cube areas is in relation to a horizontal line extending from the tip of one blade at its inner most central position to a position equal in distance from the outer tip of the opposite blade i.e. midway between these two points or at the outer blade tip. This outer distance i.e. equal to the diameter of the blade sweep area, is the absolute of the outer field with regard to the dynamics of the inner mobile flow i.e. the static boundary layer occupies this outer dimension in definition. The cubic proportion of fluid, being broken into 4 sections, descends beneath the plane of the propellers only one quarter in the above example, that is only 4 inches of a 16 inch through flow of one revolution. A line taken from the first quarter of the cube at the inner most point beneath the propellers to the outermost point of the static field on the horizontal plane of the propellers thereby represents the required interference with regard to the mobile inner flow. Less propeller pitch thereby equates to less baffle depth. In some instances, the propeller elements may have an adjustable blade pitch angle, in which case the baffles adjust in length to compliment the blade pitch angle adjustment.

Figure 9:
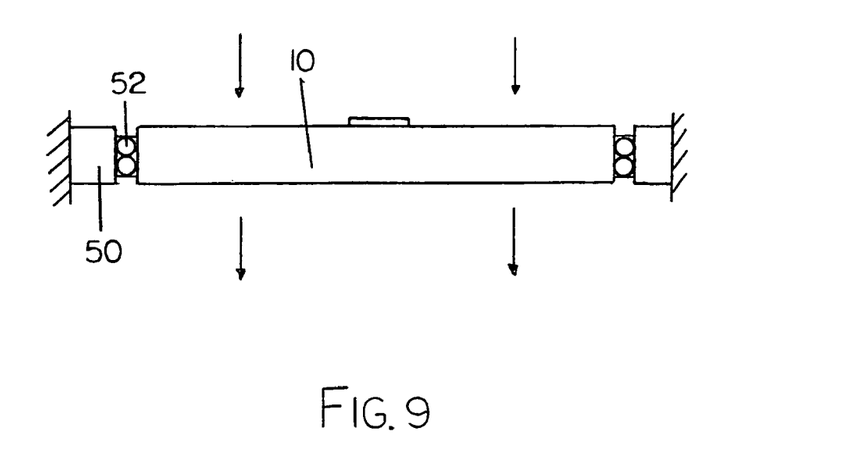
FIG. 9 is a side elevational view of the mechanism shown rotatably supported on a fixed frame.

Turning now to the embodiment of FIG. 9, the mechanism is similarly arranged to the previous embodiment, with the exception that the outer baffle be rotatably supported on a fixed support frame 50 by suitable bearings 52 and the like to permit rotation of the entire mechanism relative to a fixed frame. A suitable actuator is provided for controlling rotation of the entire mechanism about the main axis thereof relative to the support frame. When the frame of the mechanism 10 is rotatable relative to a fixed frame, rotation of the propeller elements may alternatively be provided by mounting a planetary gear on each propeller element, for rotation therewith, which meshes with a stationary central gear about which the mechanism 10 and the propeller elements are rotated. Rotation of the mechanism relative to the stationary gear when the respective planetary gears of the propellers are coupled to the stationary gear causes rotation of the propellers about their respective propeller axes with the planetary gears as the mechanism is rotated. The ratio of revolutions of the propeller elements relative to the revolutions of the mechanism is determined by the gear ratio coupled the planetary gears to the stationary central gear. The planetary gear and central gear driving mechanism of the propeller elements is also operable in mechanisms having four or six propeller elements and in instances where the frame of the mechanism 10 remains stationary, but the central gear rotates instead.

Figure 10:
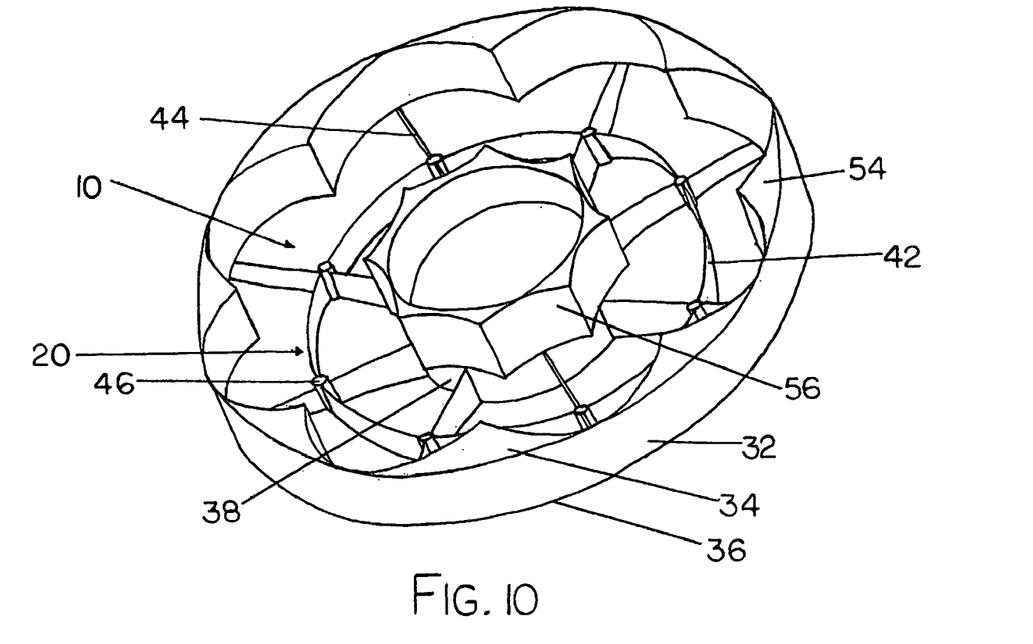
FIG. 10 is a perspective view of the infills which enclose the unswept areas of the propeller elements between the inner and outer baffles.
Figure 11A:
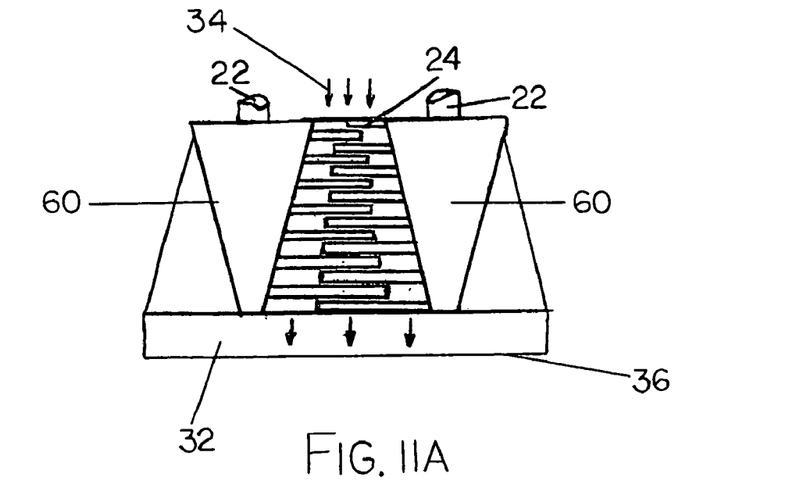
FIGS. 11A and 11B are respective side elevational and top plan views of the propulsion linearizing mechanism in a turbine generator configuration.
Figure 11B:
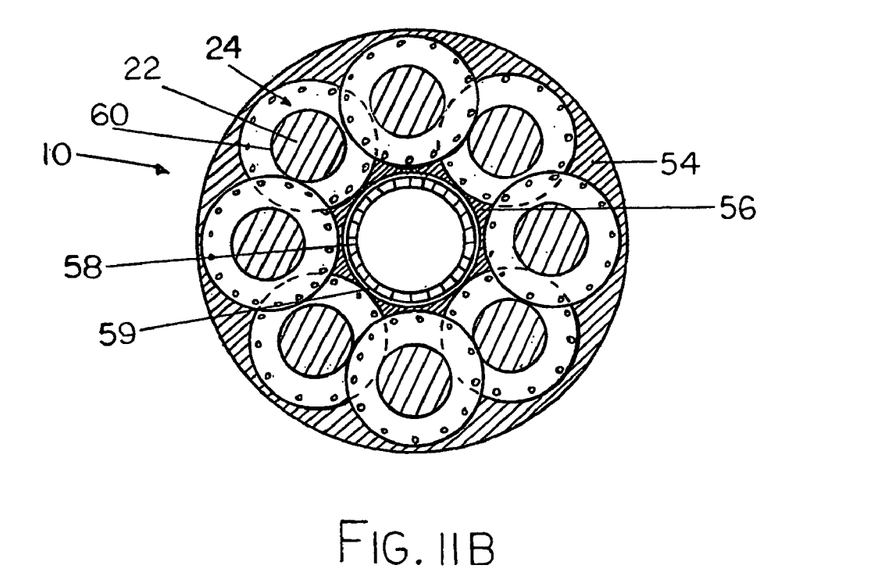
Figure 12:
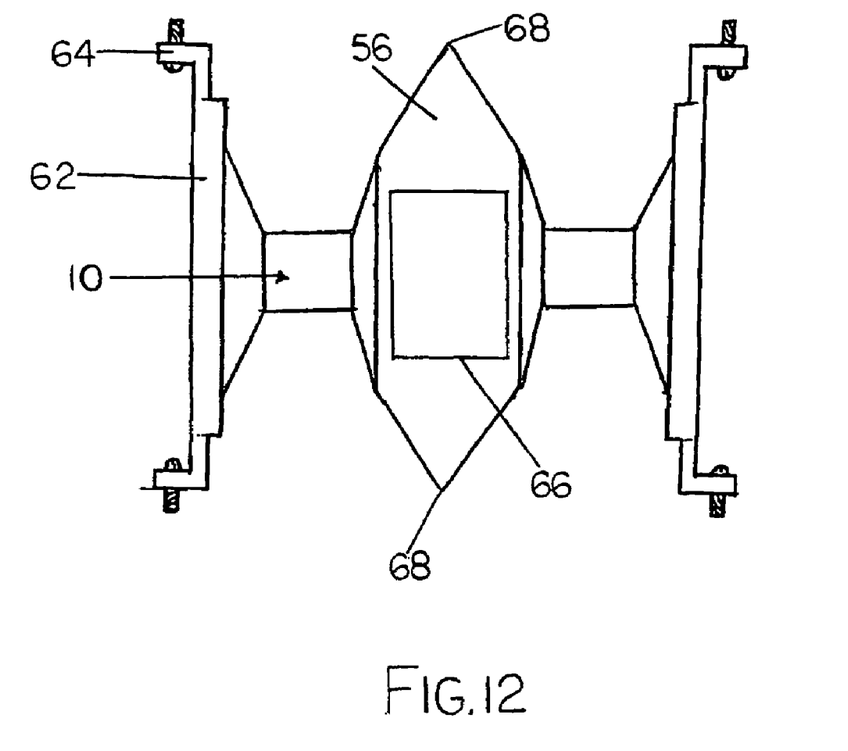
FIG. 12 is a sectional view of the propulsion linearizing mechanism in an inline pump configuration.

Turning now to the embodiments of FIGS. 10 through 12, various applications of the mechanism are illustrated in which outer infills 54 and a central infill 56 are provided. The outer infills 54 are supported on the outer baffle 32 in relief thereto to enclose the unswept areas between the collective sweep areas of the propeller elements and the outer baffle 32. Similarly the central infill 56 is supported at the inner baffle to span an unswept area in contour with the surrounding collective sweep areas of the propeller elements.

As illustrated in FIG. 10, the outer infills 54 and the central infills 56 are shown in combination with the inner baffle 38, the central baffle 42 and the radial baffles 44 which are supported downstream from the propeller elements which the infills surround. This arrangement of infills in combination with baffles may be useful for pumping configurations, turbine compressors or turbo fan jet compressors, each of which includes varying blade types on the respective propeller elements.

Turning now to FIGS. 11A and 11B, a turbine generator is illustrated which includes outer infills 54 and central infills 56 as described above. In this instance, the central infill houses a driven rotor 54 having a power takeoff mechanism for drawing power therefrom when the rotor 54 is rotated as a result of being coupled to the respective propeller elements to rotate therewith by suitable gearing 59 which is also housed within the central infill.

The propeller elements in this instance include plural blades 24 supported at plural angles relative to one another within each of several planes which are stacked in spaced orientation relative to one another in an axial direction along the respective propeller axis. Each plane of blades of each propeller element is arranged to be spaced in the axial direction from a plane of blades of adjacent propeller elements that are overlapped.

Each propeller element further includes a core 60 which is generally frustoconcial in shape tapering from a larger diameter at the upstream side to a smaller diameter at the downstream side so as to tapered with the flow direction. The blades 24 project radially from the core of the respective propeller elements so as to have a slightly increases outer diameter so that the blades nearer to the downstream side are longer than those adjacent the upstream side.

In the embodiment of FIG. 12, the mechanism is suitably arranged for being supported as an inline pump for a pipe. The mechanism includes a pipe section 62 having conventional bolt flanges 64 at each end thereof for being bolted in series with a pipeline. Infills 54 and 56 are provided as described above. The central infill houses a motor 66 for driving rotation of the propeller elements. The central infill is enclosed about the motor 66 and tapers to a pair of opposing apexes 68 along the main axis on opposing sides of the propeller elements. Similarly the outer infills 54 taper outwardly towards the outer baffle or the inner walls of the pipe section 62 in this instance, so as to be substantially flush therewith at a location spaced outwardly from each side of the propeller elements.

Figure 13:
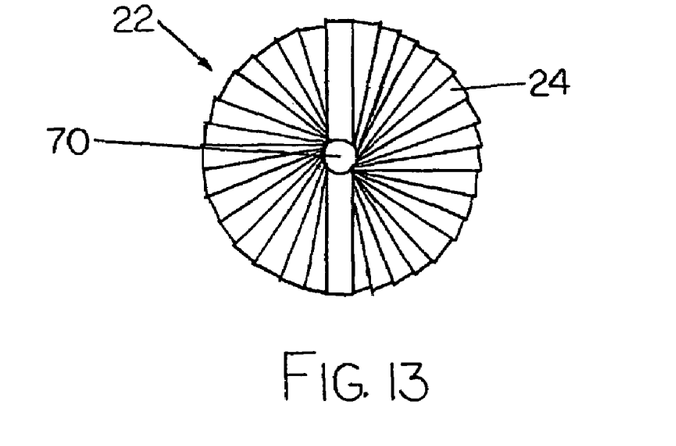
FIG. 13 is a top plan view of a propeller element for use with the propulsion linearizing mechanism in a turbo fan jet compressor configuration.

Turning now to FIG. 13, a propeller element 22 is illustrated for use in a turbo fan jet compressor having infills and baffles as illustrated in FIG. 10. In this instance each propeller element comprises a shaft 70 upon which a plurality of blades 24 extend radially outwardly therefrom. The blades are stacked along the shaft 70 in pairs of diametrically opposed blades which are offset angularly slightly from adjacent pairs of blades so that the blades collectively are in a generally helical and spiral formation. Each blade of each propeller element is oriented to be perpendicular to a corresponding blade of adjacent propeller elements which are in a common plane therewith, with the propeller elements being maintained to rotate in a fixed timing sequence relative to one another so as to avoid collision of the blades of the propeller elements. The pitch angle of the blades in this instance are equal or less than 45 degrees.

Figure 14:
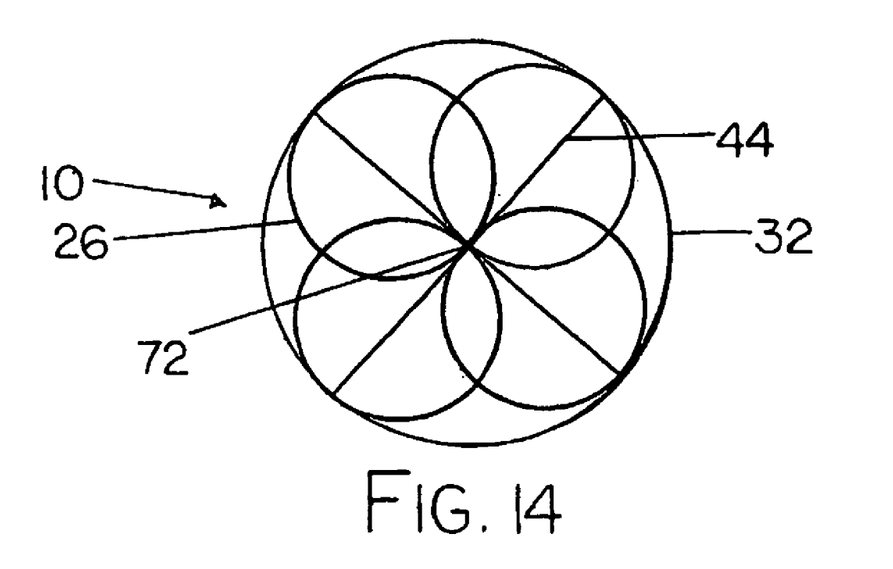
FIG. 14 is a schematic top plan view of one embodiment of the mechanism in which only four propeller elements are provided.

Turning now to the embodiment of FIG. 14, a mechanism 10 is illustrated in which only 4 propeller elements are provided with overlapping sweep areas similarly to the previous embodiments. The sweep areas are arranged to overlap one another so that an inner peripheral edge of each sweep area intersects a dead center 72 of the mechanism. In this arrangement radial baffles 44 are similarly provided as in the previous embodiments, however the baffles are arranged to intersect at the dead center and extend radially outwardly to the outer baffle 32. A central baffle 42 is again provided, spaced between the dead center 72 and the outer baffle so that one of the propellers is located at an intersection of a respective radial baffle 44 and the central baffle 42.

Figure 15A:
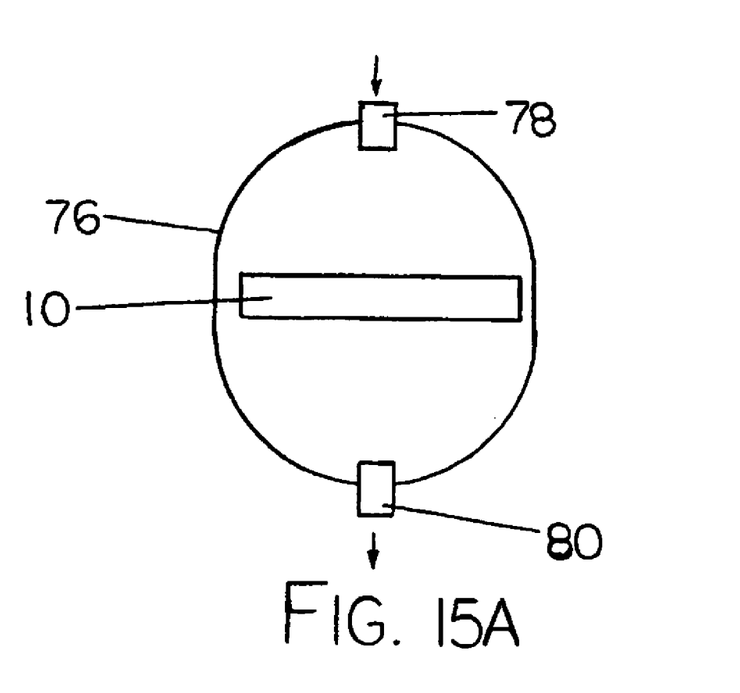
FIG. 15A is a schematic side elevational view of the propulsion linearizing mechanism in a polarizing unit configuration.
Figure 15B:
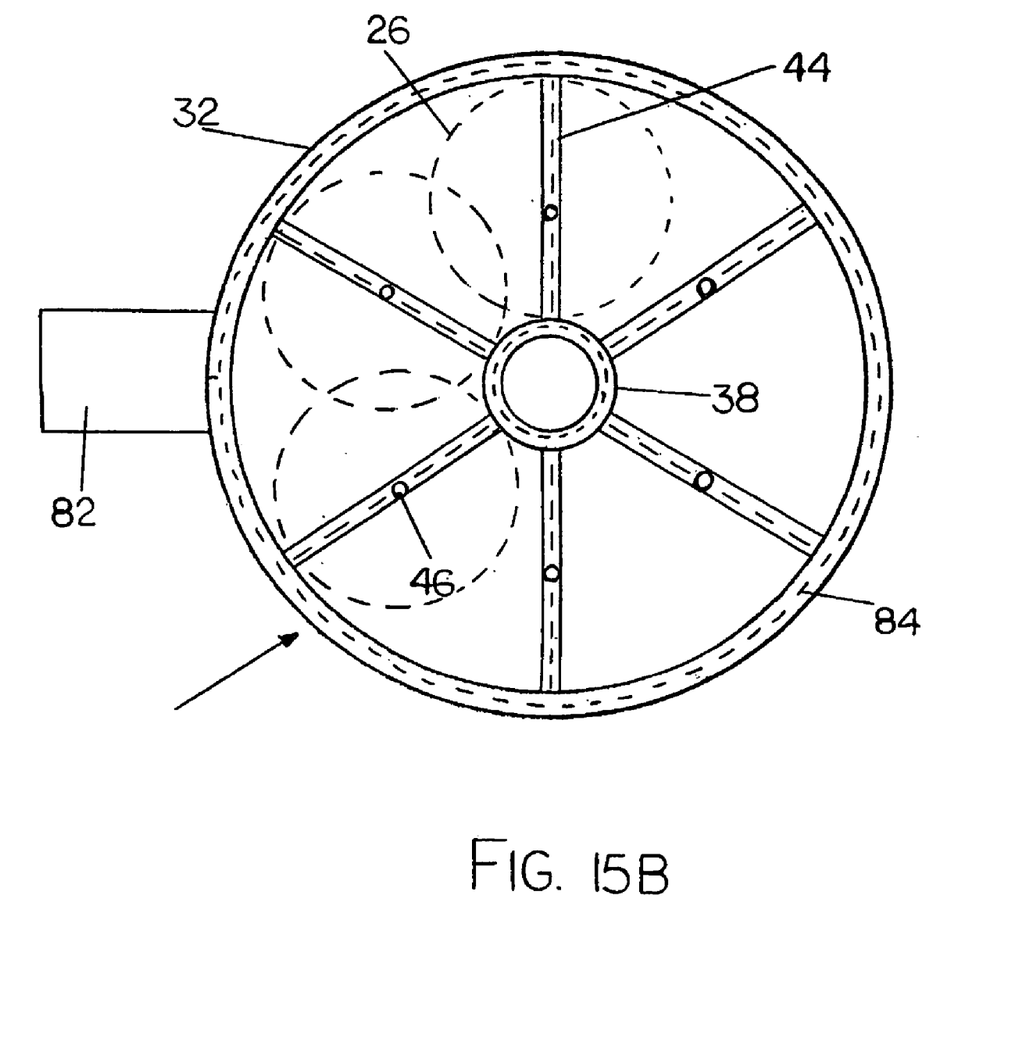
FIG. 15B is a top plan view of the mechanism according to FIG. 15A.

As illustrated in FIGS. 15A and 15B, in a further embodiment of the control mechanism 10, the mechanism may form part of a bipolar polarizing unit in the form of a research and development piece of equipment for the production of plasma by low temperature gas fusion. In this instance the mechanism is supported within a sealed chamber 76 into which gas is injected by an injector 78 and plasma is extracted at an outlet 80.

As illustrated in FIG. 15B, the mechanism in this instance includes six propeller elements 22 having sweep areas 26 which overlap the areas 26 of adjacent propeller elements by approximately 50 percent of the length of the blades which corresponds to approximately ¼ of the diameter of the propeller element. Similarly to the first embodiment, an inner baffle 38 is inscribed in the collective sweep areas with a central baffle 42 being supported spaced concentrically between the inner and outer baffles and radial baffles 44 being provided which span between the inner and outer baffles supporting the central baffle thereon. The baffles in this instance however differ in that the baffles are hollow and include passages extending there through for receiving a cooling fluid to be circulated there through as required for cooling of the baffles. A fluid circulating mechanism 82 is provided in communication with the passages 84 in the baffles to control circulation of the cooling fluid there through. In this embodiment, the propeller elements each include a pair of diametrically opposed blades which rotate in a common plane with blades of adjacent propeller elements so as to require a fixed timing sequence which synchronizes rotation of adjacent propeller elements to be offset from one another by 90 degrees as described above. Each blade has a pitch angle of less than 45 degrees as in previous embodiments. In operation gases are injected in pulses at intermittent intervals permitting plasma to be extracted from the sealed chamber 76.

As noted above with regard to the first embodiment, the 16 propeller blades that overlap one with another in the first embodiment and have a pitch angle of 45 degrees, are mounted in a fixed 90 degree timing sequence upon 8 rotors or propeller elements that are positioned circumferentially around a common main axis within respective pivot mounts at an intersection of the circular, central baffle and a respective one of the radial baffles.

When power is supplied to the rotors or propeller elements by an electric motor via a belt drive transmission system in the first embodiment, the propeller blades rotate, drawing air down from above on tangents of spiral flow 100 into the manifold of baffles and driving the air into the inner chambers 102 of the inner mobile field system 103 and the outer chambers 104 of the outer mobile field system 106. Within these chambers, the air oscillates on tangential forces 108 on either side of the central baffle within the mobile field system 103,106.

This creates added pressures beneath the propeller elements because as the oscillating tangential forces 108 exit the baffle arrangement on either side of the central baffle, they collide causing the binary flow of the main mobile field 103,106 of flow to become linear and perpendicular to the propeller elements.

This transformation of the mobile tangential forces of curvature flow 108 to the mobile linear flows creates two continuous loops of backflowing air 110 referred to as the economy flow system within the main flow of the mobile field 103,106. One of these continuous loops of backflowing air 110 that pertains to the inner field system 103, cycles between the planes of the propellers within the unswept areas 112 of the propeller sweep that are bordered by the inner baffle and the propeller sweep areas 114. The other loop of backflowing air 110 pertains to the outer field system 106 and it cycles between the inner field and the outer field by circumscribing the central baffle and cycles the plane of the propellers within the unswept areas of propeller sweep that are bordered by the outer baffle and the propeller swept areas.

This economy flow system 110 within the main flow of the mobile field 103,106 provides the propellers with an increase in thrust potential by causing a delay in the separation of the air from the lifting surfaces of the propellers and also this economy flow system establishes a static field of non flow within the inner areas 124 of the main flow of the mobile field on both sides of the propellers plane of horizontal sweep and it also establishes a static field of non flow within the outer areas 126 of the main flow of the mobile field on both sides of the propellers plane of horizontal sweep.

These static fields of non flow 124, 126 together with the main flow of the mobile field system establishes and constitutes on either side of the propeller planes, one quarter of the unified field of the propulsion/hover system comprised of the absolute positive forces of mobile linear flows 128, the absolute positive forces of static curvature flows 130, the absolute negative forces of mobile linear flows 132 and the absolute negative forces of static curvature flows 134. Thereby, the octonary bi-polar propulsion/hover system achieves 8 neutral potentials of a mobile vertical linear force and 8 neutral potentials of a static horizontal curvature force.

This outer static neutral field of non flow 126 and inner central static neutral field of non flow 124 provide the octonary propulsion/hover assembly with strategic areas that can be utilized in the design of an air/hover craft vehicle. In order to facilitate the dynamics of free flight/hover with regards engine torque an interrelated system of power is required within the inner central area of non flow 124. Such a propulsion/hover system complete with static utility mantle 136 as featured in the embodied concept of the invention would, as a fully developed air/hover craft vehicle, provide a tremendous potential of lift due to its strong geometric structure of design and its method of achieving a binary system of vector propulsion. This would also provide optimum stability for vertical take-off and landing with hover capability. An interchangeable carrier system to facilitate a variety of uses. A multiple engine system would allow for engines to be serviced or replaced during flight. The present invention would also provide a very quiet low noise level propulsion system due to the unified linear and curvature flow system of the force field. Less fuel consumption than conventional methods of flight may be expected due to the linear vector forces of flow.

To embody the concept into the design of a pump, such a pump would provide a continuos high volume, steady state, full linear flow at the intake and delivery of the flow because no turbulence is created by the integral rotary action of the blades within the pump. No internal economy flow system is required when used as a pump.

The motor to drive the pump is installed within the central position of the pump or situated externally. The blades are two or more per rotor or propeller element of a 180 degree spread or less and an angle pitch to compliment the viscosity of the fluid and the required velocity flow with regards power input.

Where the areas of blade none sweep occur, contoured infills are required as described above so as to provide a smooth delivery of fluid into the integral blading system. Also the transmission system to the blading arrangement can be by gears situated on the inflow side upstream of the discoid. The contoured infills compliment the pitch angle of the blades. The contoured infills compliment the fluid flow and pressure densities during the inflow, the through-flow and the outflow of the fluid as it passes through the pump.

To embody this concept into the design of a flow meter, such a meter would create no turbulence with the flow being metered and thereby, provide greater accuracy of a metered flow. The design would be the same as that of a pump with a transmission system fitted to a meter.

To embody this concept into the design of a turbine generator as described above, such a generator would not require the inclusion of stators to control flow as the flow would be controlled by the integral rotary action of the impeller blades. The blades would be stacked in an alternate tier stacking format so that as the blades rotate upon each rotor, they pass between the rotational planes of one another and thereby by rotary activity keeps the flow of fluid substantially linear in format. Also, the turbine configuration does not require the bi-polar assembly using the baffle arrangement of the first embodiment beneath the integral impeller blade set-up, but does require contoured infills to infill the non sweep areas of impeller activity. The reason for the non requirement of the bi-polar baffle assembly beneath the impellers is because the fluid is already structured by conduits into linear flows and the contoured infills in situ with the integral impeller action keeps the flow of fluid linear throughout the throughflow of the generator configuration.

To embody the concept of the present invention into an integral bi-polar mixer or blender, such a configuration would provide a method whereby a total mix of the entire vat contents would be mixed and blended by two interrelated flows of variable flow velocity that would compliment one another and in doing so maintain a control of the materials being mixed and blended without the need of flow shields.

To embody the concept of the present invention into the design of a fan or blower whereby the whole assembly is able to achieve variable states of rotation, in the same plane of rotation as that of the blade assembly, the mechanism has the ability to deliver variable types of flow from described herein as Type 1. through to Type 3.

In Type 1, steady state, full linear flow is achieved with the flow mechanism, similar to as if, the dispensed fluid is flowing within an enclosed conduit in which there is no flow outside of the immediate area of flow. This linear type flow continues until it hits the target area and is ideal for wind tunnel testing to be undertaken without the need of constructing an enclosed rigid structure, for example a tunnel, to contain the wind. To achieve this flow pattern, the support frame of FIG. 9 is static when in operation and only the propeller elements are rotated.

In a Type 2 operation, semi-steady, semi-linear flow is achieved with the mechanism to deliver a flow with a degree of curvature flow and thereby, provide a well defined isolated area of circulating fluid within a greater volume of space. To achieve this flow pattern, the mechanism is rotated slowly about the main axis on its support frame, shown in FIG. 9, while in operation.

In a Type 3 operation, non-steady, non-linear flow is achieved with the mechanism to maximize fluid intake at the expense of losing a definition of linear flow and thereby, the mechanism achieves a very high velocity full flow intake and provides a blower with a comparatively small area intake to be able to deliver a large volume outflow at the blower head. To achieve this flow pattern the mechanism is rotated very quickly about the main axis on the support frame of FIG. 9 while in operation.

These states of flow also apply to air/marine propeller propulsion systems, providing such with unique features that are reflected in improved performance with an overall increase in energy efficiency The internal flow with force relates to an understanding whereby potential energy can be comprehended as mobile and static mantles that in turn can represent the dimensions of mobile wave energy and static corpuscle energy with regards a unified field in which these potentials of energy alternate dimensions by flowing in a loop between plane dimension. When these looped potentials are unified into a four dimensional field, the field is unified in a quadruplet format consisting of four loops with two poles of eight potentials. Consequently, the economy flow system of the embodied concept, being octonary, provides a unified field of sixteen loops with two poles and thirty two potentials.

Also the propeller timing sequence that involves the setting of the propellers at a 90-degree angle to one another is important with regard to achieving four areas of compression within each chamber by a 360 degree propeller sweep and four corresponding areas of expansion above each chamber that are connected by circuits of flow that flow within the main linear flow of the field and thereby, by resolution these circuits contribute added dimensions and structure to the field in the form of added pressures provided by four dimensions per circuit i.e. two vertical and two horizontal, that represent flow fields of unequal potentials. And it was with regard to this resolution of flow pertaining to the flow fields of multiple electric generator set-ups regarding armature rotation timing sequences to achieve motive electronic propulsion by forming quadruplet field potentials of structured volume and size potentials of 'curvature' force energy that the embodied concept with regard to such an internal economy flow system was incorporated into the design of this propulsion/hover device.

This invention relates to and demonstrates the static and mobile, mechanics of energy interaction. The multiple blade system with regards the integral rotor set-up is referred to as a discoid. The discoid has an optimum blade overlapping sweep of 50% within the areas of blade sweep. This 50% overlapping sweep of the blades with regard to being optimum is in reference to performance that in turn is related to the basic quadruplet discoid set-up, that pertains to the four dimensions of mobile energy within or of two dimensions of static energy. Consequently the mechanism is, by design with regard to an attribute of movement, able to deliver variables of flow to suit various requirements with regards fan/blower technology.

Discoids are formed of bladed rotors that are mounted circumferentially around a common axis, in such a way, that the blades overlap within the areas of sweep.

The bi-polar assembly/baffle arrangement is a requirement when it is necessary to construct a conduit of static energy around the external areas of the discoid or when an entrapment area of added pressure is required beneath the discoid. When no static field is required to be produced around or exterior to the discoid and no added pressure is required beneath the discoid such as when the system is installed as an inline pump, then no bi-polar assembly or baffle arrangement is required, but it is necessary to infill the areas of non blade sweep within the discoid with contoured infills to compliment the integral action of the blades because whether fluid is forced through an impeller discoid arrangement to turn rotors or is drawn by the blades to create a flow into, through and out of the discoid, as in the case of a turbo linear pump, vertical contoured infills are required.

Infills are required when fluid represents the mobile energy and the discoid represents the static force, such as in a pump or a turbine generator.

The bi-polar assembly/baffle arrangement is required, without infills, when the discoid represents the mobile energy and the fluid represents the static force, such as in a propulsion/hover unit.

Both infills and bi-polar assembly or baffle arrangement are required when the fluid represents static energy of a mobile potential and the discoid represents static energy of mobility, such as in a turbine compressor unit.

The design of the discoid with regards to the number of blades and the arrangement of blades upon each rotor is dependent upon the application. For instance, integral turbine generator setups require multiple blades upon each rotor of a 360 degree radial format and therefore, require alternate blade stacking with regards each rotor so that the blades are able to rotate and pass between the individual planes of blade rotation and it is this arrangement together with contoured infills to compliment the integral impeller blade activity that the high pressure fluid flow required to turn the rotors is kept linear without the need of stators. Integral turbine generator set-ups operate by converting high pressure into low pressure by energy absorption into rotor rotation.

Integral turbine compressors require the 90 degree timing sequence format because the fan blades are stacked radially along the axis of each rotor forming two spirals of 180 degrees upon each rotor and this formation together with a bi-polar assembly/baffle arrangement in the presence of contoured infills to compliment the integral blade activity keeps the fluid flow linear and under pressure without the need of stators. Integral turbine compressor set-ups operate by creating high pressure from low pressure by rotor rotation/energy input.

Integral turbine pumps also require the 90 degree timing sequence format with regards the blading arrangement, that can involve two blades per rotor of a 180 degree radial linear spread, each blade at an angle pitch of 45 degrees or less in the presence of contoured infills to compliment the integral blading activity and the inflow, the through flow and the outflow of the fluid.

Contoured infills, when in a discoid system that draws the fluid into, through and delivers it out of the system such as a pump, are contoured in two dimensions horizontally and vertically, to compliment the sweep of the blades, the angle of pitch and the resultant flow of the fluid. Also the transmission system is preferably by gears situated out of the interacting forces with regards the delivery system.

In the above description, binary force refers to a two force system, whereas bi-polar refers to two poles of curvature and linear that share an axis. The conduits represent static energy. The discoid, in this instance, refers to a multiple integrally bladed propeller elements mounted circumferentially around a common axis.

As noted above with regard to the first embodiment, there are two propeller blades per rotor at a pitch angle of 45 degrees, each blade occupying the same plane of rotation. There are eight rotors mounted cicumferentially around a common axis above an arrangement of baffles within a manifold. This configuration of the propeller assembly set-up, is such that the circumference of all eight propellers touch a circumscribed line, around the central axis, that encloses a space equal in area to the sweep area of one of the propellers. This arrangement compliments the required internal economy flow system because of the geometric relationship between the overlap of the propeller swept areas with those of the unswept areas within the manifold. The same applies to a quadruplet propeller set-up when the blade tips sweep the dead center and a line circumscribes the outer area of sweep of the blades. The unswept areas within the circumscribed area equals the area of the propeller sweep overlaps.

Because the blades overlap on the same plane of rotation, the blades are positioned to one another in a fixed 90 degree timing sequence so as to ensure no blade strike occurs. Consequently only two blades are provided per rotor in the first embodiment. Multiple stacking of this 90 degree format upon each rotor allows for the placement of more blades, if more blades are required. When more than two blades are required on the same plane of each rotor, the blades are stacked in an alternate tier stacking format so that as the blades rotate upon each rotor they pass between the rotational planes of one another and thereby, no blade strike occurs.

In the first embodiment, the rotor mounts which rotatably support the propeller elements on the frame of the mechanism, are fixed within the circular baffle or collar that is perpendicular to the rotation plane of the propellers and that surrounds a common axis. The inner sweep areas of the blades are circumscribed by a circular border that is perpendicular to the plane of the propellers and that extends beneath the plane of the propellers to form a baffle with a depth that correlates to the pitch of the propellers and that extends above the plane of the propellers to form the inner wall of the induction manifold. The outer sweep areas of the blades are also circumscribed by a circular border that is perpendicular to the plane of the propellers and that extends beneath the plane of the propellers to form a baffle that is half the depth to that of the inner baffle and that extends above the plane of the propellers to form the outer wall of the induction manifold. The central circular collar/baffle is in a midway position between the outer baffle and the inner baffle and extends beneath the plane of the propellers to a depth that compliments both the inner baffle and the outer baffle. This central collar/baffle is fixed in place by a series of perpendicular baffles at each propeller pivot mount, the depths of which conform to the depths of the inner baffle, the outer baffle and the central baffle The same applies to a quadruplet propeller set-up with the exception that the perpendicular baffles positioned at each propeller mount join at the dead center.

The arrangement of the propellers to the baffles is such that air is forced down into the baffles by the action of the propellers and because of the configuration of the baffles, to each propeller the displacement of air regarding each propeller is broken into four portions. Because of the overlap of the propellers, the displaced air is driven into the baffles from alternating directions that portray an inner and an outer propeller stroke with regard to the action of the propellers as they cross over the central baffle. This propeller action in situ with the baffles, causes the displaced air within the individual chambers of the baffles to oscillates with a degree of curved tangential flow. Consequently, the oscillating air in the inner chambers between the inner baffle and the central baffle, oscillates and curves in the same direction to the air that oscillates and curves in the outer chambers between the outer baffle and the central baffle. This oscillation and curved tangential flow of the air within the chambers of the baffle arrangement causes the air to undergo a period of entrapment that creates an added pressure beneath the planes of the rotating propellers. The contours of the propeller swept areas with that of the inner and outer circular baffle is such that strategic areas devoid of propeller activity exist, allowing air to flow between the planes of the propeller rotation in a counter direction to that induced by the propellers. This activity of flow allows the inner chambers to receive recycled air from both the inner and outer chambers and thereby, the inner flow of induction is supplemented by a means that increases the thrust of the propellers by delaying the separation of the air from the lifting surface of the propellers. The oscillating air within the inner and outer chambers together with the economy flow system provides the intake and the delivery with a flow of fluid that possesses both quality and identity. The system of economy provides the inflow and outflow of fluid with an insulation that equates as fluid identity and the interaction of the oscillating force potentials provides the flow of fluid with a flow quality that is linear. The reason why this linear flow pattern occurs is due to the descent of the oscillating tangential forces on either side of the central baffle because as these potentials of force pass over the central baffle and exit, the tangential forces collide, in such a way, that the resultant force is perpendicular to the plane of the propellers and thereby, linear in flow and force.

The mantle extends out from the outer baffle in a horizontal position that in length is equal to the lengths of two propellers and in doing so defines the static area of the field of the bi-polar flow system.

In the first embodiment, the central circular collar/baffle has a degree of vertical depth that correlates, in depth, to the coaxial vertical baffles of depth and with the propellers angles of pitch. The inner circular diametrical field baffle has a vertical depth that equates to the propellers as one quarter of the linear displacement achieved by one such revolution of one of the propellers. The outer circular circumferential field baffle has a vertical depth that equates to the propellers as one eighth of the linear displacement achieved by one such revolution of one of the said propellers. The radial baffles are disposed vertically in a radial axis at each propeller element pivot mount, each being connected in the same axial plane and complimentary in depth to the vertical circular inner diametrical field baffle, the vertical circular collar/baffle and the vertical circular circumferential field baffle and thereby, such baffles form a web arrangement beneath the plane of the propellers. An outer utility mantel of the circular circumferential baffle extends horizontally outwards to a distance that equals, more or less, the combined lateral dimensions of the inner diametrical field and the outer circumferential field or the approximate length of two propeller blades.

In the integral turbine generator set-up of FIGS. 11A and 11B for maintaining an inputted fluid in a linear flow while providing the generator with rotary motive force, the mechanism in this instance includes an arrangement of eight propeller elements that support a plurality of blades on each which are stacked in an alternate 360 degrees tier stacking format along the linear radial axis of each propeller element. The overlap blade sweep is by 50% on respective planes of blade rotation allowing the blades to rotate without incurring blade strike. The propeller elements are typically cone contoured to facilitate flow. The eight propeller elements are equally spaced and fixed respectively in pivot mounts at either ends around the main axis. Around the inner areas of blade sweep is a close fitting contoured conduit that flares in keeping with the linear radial axis of the impellers providing a vacant space within the interior of the set-up, within which a propeller element is longitudinally disposed parallel to the surrounding individual propeller elements for the purpose of accepting rotary motive forces from the surrounding individual propeller elements. Around the outer areas of blade sweep, is a close fitting contoured conduit that flares in keeping with the linear radial axes of the impellers and this conduit together with the inner conduit correlates so as to form a ventricle that is sealed at one end with inclusions of fluid inlets and that is open at the other end to allow the fluid to outflow and thereby the through flow of the forced flow fluid input through the ventricle is kept linear by the integral rotary activity of the impellers.

As described above with regard to FIGS. 15A and 15B, a bi-polar polarizing unit is provided in the form of a research and development piece of equipment for the production of plasma by low temperature gas fusion. In this instance the mechanism comprises an arrangement of six propeller elements that support two propeller blades per rotor. The propeller blades share the same plane of axial rotation and overlap one with another by half the blade length within the areas of sweep, each blade having an angle pitch of no more than 45 degrees and each propeller element being fixed in a rigid 90 degree synchronized rotation timing sequence format. The six propeller elements are fixed respectively in pivot mounts within a hollow circular collar/baffle around the main axis in a vertical upright position. An arrangement of hollow vertical baffles, disposed coaxially and radially, are fixed in situ with the hollow circular collar/baffle beneath the horizontal plane of the propellers. The hollow central circular collar/baffle is fixed in place by individual hollow radial baffles situated at each rotor pivot mount and that radially connect the hollow outer circular circumferential baffle to the hollow central circular collar/baffle and the hollow central circular collar/baffle to the hollow inner circular diametrical baffle. The hollow outer circumferential baffle circumscribes the outer areas of propeller sweep. The hollow inner circular diametrical baffle circumscribes the inner areas of propeller sweep and by such a hollow bi-polar baffle arrangement is formed whereby an inner diametrical field of flow comprised of individual chambers and an outer circumferential field of flow also comprised of individual chambers is established and whereby such a hollow baffle arrangement is able to convey a liquefied gas throughout the system and thereby keep the baffles cool. The bi-polar polarizing unit is installed within a biosphere/sealed spherical vessel into which at intermittent intervals during the operating of the equipment gas or gases are pulsed into the biosphere and plasma is extracted. The baffles are hollow so as to facilitate a flow of fluid. The mechanism is isolated within the sealed vessel. Fluid is allowed into the environment of the unit in intermittent pulses while the mechanism is operating.

In this disclosure, there are shown and described only the preferred embodiments of the invention but it is to be understood that the invention is capable of being applied to various other applications by those skilled in the art, in a series of combinations and environments other than those that have been previously mentioned and accordingly reference should be made to the appended claims rather than the foregoing discussion of preferred examples, to assess the scope of the invention in which exclusive rights are claimed.

What is claimed is:

1. A propulsion linearizing mechanism for linearizing a fluid flow, the mechanism comprising:

a generally cylindrical outer baffle arranged to direct flow of fluid therethrough in a flow direction substantially parallel to a central main axis of the outer baffle from an upstream side to a downstream side of the outer baffle; and a plurality of propeller elements supported for rotation, each about a respective propeller axis, the propeller axes being parallel to one another and the main axis of the outer baffle and being spaced circumferentially about the main axis;

each propeller element defining a respective sweep area as the propeller element is rotated about the respective propeller axis thereof which lies perpendicular to the respective propeller axis;

the propeller elements being located such that the outer baffle circumscribes an outer periphery of the collective sweep areas of the respective propeller elements and such that the sweep area of each propeller element is arranged to overlap the sweep area of adjacent propeller elements;

the propeller elements being supported for rotation in the same direction whereby forces of curvature flow of adjacent propeller elements substantially cancel one another to linearize fluid flow in the flow direction.

2. The mechanism according to claim 1 wherein each propeller element comprises a pair of diametrically opposed blades.

3. The mechanism according to claim 2 wherein the propeller elements are all supported for rotation within a common plane, rotation of each propeller element being fixed in timing with rotation of adjacent propeller elements to avoid collision of the propeller elements at the overlapping sweep areas.

4. The mechanism according to claim 1 wherein the propeller axes are fixed in position relative to one another.

5. The mechanism according to claim 1 wherein the propeller elements each comprise a plurality of blades, each propeller element being rotatable within the respective sweep area which is parallel and spaced in a direction of the main axis from the overlapping sweep areas of adjacent propeller elements.

6. The mechanism according to claim 1 wherein each propeller element comprises a plurality of blades, the sweep area of each propeller element overlapping the sweep area of adjacent propeller elements within a range of 40% to 60% of a length of the blades of the propeller elements.

7. The mechanism according to claim 6 wherein the sweep area of each propeller element overlaps the sweep area of adjacent propeller elements by approximately 50% of a length of the blades of the propeller elements.

8. The mechanism according to claim 1 wherein there is provided a generally cylindrical inner baffle inscribed within an inner periphery of the collective sweep areas of the respective propeller elements.

9. The mechanism according to claim 8 wherein the propeller elements are located relative to one another such that an unswept cross sectional area between the inner and outer baffles is substantially equal to an overlapping portion of the sweep areas of the propeller elements.

10. The mechanism according to claim 8 wherein the inner and outer baffles at the upstream side of the outer baffles extend in a direction of the main axis beyond the propeller elements.

11. The mechanism according to claim 8 wherein the outer baffle includes a shelf extending radially outward a distance substantially equal or greater than a diameter of one of the sweep areas of the propeller elements.

12. The mechanism according to claim 8 wherein there is provided 8 propeller elements supported at even circumferential spacings between the inner and outer baffles, a cross sectional inner area spanning the inner baffle being substantially equal to the sweep area of one of the propeller elements.

13. The mechanism according to claim 12 wherein the inner area spanning the inner baffle is enclosed.

14. The mechanism according to claim 12 wherein there is provided a driving motor housed within the inner area for driving rotation of the propeller elements.

15. The mechanism according to claim 12 wherein there is provided a driven rotor housed within the inner area for being driven by rotation of the propeller elements when supported in a moving fluid.

16. The mechanism according to claim 12 wherein the inner area houses common gearing coupling the propeller elements for rotation together at a predetermined timing relative to one another.

17. The mechanism according to claim 8 wherein there is provided a cylindrical central baffle concentrically spaced between the inner and outer baffles, the propeller axes being located at spaced positions about the central baffle.

18. The mechanism according to claim 17 wherein there is provided a plurality of radial baffles extending in a radial direction from the main axis between the inner and outer baffles and supporting the central baffle.

19. The mechanism according to claim 18 wherein each propeller axis is located at an intersection of the central baffle and a respective one of the radial baffles.

20. The mechanism according to claim 18 wherein the central baffle and the radial baffles are supported on a downstream side of the propeller elements.

21. The mechanism according to claim 1 wherein an unswept area between the outer baffle and the collective sweep areas of the propeller elements is enclosed by contoured infills which surround the collective sweep areas of the propeller elements, the contoured infills being in relief and fixed with respect to the outer baffle.

22. The mechanism according to claim 21 wherein the contoured infills are tapered to be substantially flush with the outer baffle as the contoured infills extend in a direction of the main axis away from opposing sides of the propeller elements.

23. The mechanism according to claim 21 in a pumping configuration.

24. The mechanism according to claim 21 wherein there is provided a central infill spanning a central unswept area surrounded by the collective sweep areas of the propeller elements, the central infill being tapered towards opposing apexes along the main axis on opposing sides of the propeller elements.

25. The mechanism according to claim 24 in a turbine generator configuration in which the central infill houses a rotor which is coupled to the propeller elements so as to be driven by rotation of the propeller elements and wherein there is provided a power take off mechanism for capturing power from rotation of the rotor.

26. The mechanism according to claim 25 wherein each propeller element comprises a plurality of blades at various positions about a full circumference of the propeller element, the blades of each propeller element being rotatable in one or more planes which are offset in a direction of the main axis from the blades of adjacent propeller elements.

27. The mechanism according to claim 26 wherein length of the blades increases in the flow direction.

28. The mechanism according to claim 1 wherein there is provided four propeller elements supported at evenly spaced positions about the main axis, an inner periphery of each sweep area being intersected by the main axis.

29. The mechanism according to claim 28 wherein there is provided a generally cylindrical central baffle intersecting the propeller axes.

30. The mechanism according to claim 29 wherein there is provided a plurality of radial baffles extending in a radial direction of the main axis and supporting the central baffle, the radial baffles intersecting one another at the main axis.

31. The mechanism according to claim 1 wherein the propeller elements are rotatably supported on a frame with the propeller axes in fixed relation to one another and the frame, the frame being supported for rotation about the main axis.

32. The mechanism according to claim 1 in a turbo fan-jet compressor configuration, the mechanism further comprising:

contoured infills enclosing an unswept area between the outer baffle and the collective sweep areas of the propeller elements, the contoured infills surrounding the collective sweep areas of the propeller elements and being tapered on opposing sides of the propeller elements towards the outer baffle;

a central infill spanning a central unswept area surrounded by the collective sweep areas of the propeller elements, the central infill being tapered towards the main axis on opposing sides of the propeller elements;

a cylindrical central baffle concentrically spaced between the central infill and the outer baffle, the propeller axes being located at spaced positions about the central baffle; and a plurality of radial baffles extending in a radial direction of the main axis between the central infill and outer baffles and supporting the central baffle.

33. The mechanism according to claim 32 wherein each propeller element comprises a plurality of pairs of diametrically opposed blades which are stacked along the propeller axis at various angles relative to one another in a helical configuration, each blade having an equal angle pitch of no more than 45 degrees.

34. The mechanism according to claim 33 wherein the blades of each propeller element lie in a common plane with corresponding blades of adjacent propeller elements, the propeller elements being rotated together at a predetermined timing relative to one another to avoid collision of adjacent propeller elements having overlapping sweep areas.

35. The mechanism according to claim 1 in a polarizing unit configuration for production of plasma by low temperature gas fusion, the mechanism further comprising:

a generally cylindrical inner baffle inscribed within an inner periphery of the collective sweep areas of the respective propeller elements;

a generally cylindrical central baffle concentrically spaced between the inner and outer baffles; and a plurality of radial baffles extending in a radial direction of the main axis between the inner and outer baffles and supporting the central baffle;

at least one of the baffles including a passage for receiving a cooling fluid to be circulated therethrough.

36. The mechanism according to claim 35 wherein each propeller element comprises a pair of diametrically opposed blades, each having a pitch angle of less than 45 degrees, the sweep area of each propeller element overlapping the sweep area of adjacent propeller elements by approximately 50% of a length of the blades of the propeller elements.

37. The mechanism according to claim 35 wherein there is provided six propeller elements which are supported for rotation within a generally common plane, rotation of each propeller element being fixed in timing with rotation of adjacent propeller elements to avoid collision of the propeller elements at the overlapping sweep areas.

38. The mechanism according to claim 35 in combination with a sealed spherical vessel into which gases are pulsed at intermittent intervals and plasma is extracted.

* * * * *